(12) United States Patent
Humfeld (10) Patent No.: US 8,455,055 B1
(45) Date of Patent: Jun. 4, 2013

(54) ALIGNING NANOTUBES

(75) Inventor: Keith Daniel Humfeld, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 1391 days.

(21) Appl. No.: 11/924,931

(22) Filed: Oct. 26, 2007

(51) Int. Cl.
*B05D 1/18* (2006.01)
*B05D 1/36* (2006.01)

(52) U.S. Cl.
USPC ..... 427/430.1; 427/402; 427/331; 427/372.2; 977/840; 977/842

(58) Field of Classification Search
USPC ..................................................... 427/430.1
See application file for complete search history.

(56) References Cited

U.S. PATENT DOCUMENTS

| | | | |
|---|---|---|---|
| 4,511,604 A * | 4/1985 | Barraud et al. | 427/402 |
| 4,645,693 A * | 2/1987 | Roberts et al. | 427/402 |
| 4,785,762 A * | 11/1988 | Miyazaki et al. | 118/402 |
| 4,927,589 A * | 5/1990 | Egusa et al. | 264/259 |
| 6,781,166 B2 | 8/2004 | Lieber et al. | |
| 7,354,877 B2 | 4/2008 | Rosenberger et al. | |
| 7,745,498 B2 * | 6/2010 | Pereira et al. | 516/33 |
| 2003/0044608 A1 | 3/2003 | Yoshizawa et al. | |
| 2005/0095938 A1 | 5/2005 | Rosenberger et al. | |
| 2005/0176249 A1 | 8/2005 | Pfefferle et al. | |
| 2006/0134326 A1 * | 6/2006 | Watanabe et al. | 427/180 |
| 2008/0182013 A1 * | 7/2008 | Reeves et al. | 427/118 |
| 2009/0110897 A1 | 4/2009 | Humfeld et al. | |

OTHER PUBLICATIONS

Kim et al. Langmuir-Blodgett Films of Single-Wall Carbon Nanotubes: Layer-by-layer Deposition and In-plane Orientation of Tubes. Jpn. J. Appl. Phys. vol. 42 (2003) pp. 7629-7634.*
Jia et al. Aligned single-walled carbon nanotubes by Langmuir-Blodgett technique. Journal of Applied Physics 104, 074318 (2008).*
USPTO office action dated Aug. 17, 2010 for U.S. Appl. No. 11/924,948.
USPTO office action dated Jan. 24, 2011 for U.S. Appl. No. 11/924,948.

* cited by examiner

*Primary Examiner* — David Turocy
(74) *Attorney, Agent, or Firm* — Yee & Associates, P.C.

(57) ABSTRACT

A method for aligning nanotubes. In one embodiment, a method is used to align nanotubes. A bath with nanotubes dispersed on the surface of a solution is provided. An attachment surface is provided to attach the nanotubes. The attachment surface is placed into the bath at an angle of around ninety degrees relative to a surface of the bath. The attachment surface is removed from the bath at a rate sufficient to apply a velocity to the nanotubes in the bath of nanotubes such that the nanotubes are aligned on the attachment surface in a direction that is substantially parallel to the direction at which the substrate is removed to form a plurality of aligned nanotubes.

19 Claims, 5 Drawing Sheets

ALIGNING NANOTUBES

CROSS REFERENCE TO RELATED APPLICATION

The present disclosure is related to U.S. patent application Ser. No. 11/924,948; filed even date hereof, assigned to the same assignee, and incorporated herein by reference.

BACKGROUND INFORMATION

1. Field

The present disclosure relates generally to nanotechnology and in particular to nanotubes. Still more particularly, the present disclosure relates to a method and apparatus for a structure made of nanotubes.

2. Background

Nanotechnology is a field of applied science and technology in which the control of matter on a molecular level occurs in scales less than one micrometer. This type of technology also relates to the fabrication of devices the size of one to one-hundred nanometers. This type of technology may draw from different fields, such as applied physics, material science, colloidal science, device physics, mechanical engineering, and even electrical engineering.

One type of nanotechnology involves nanotubes. A single-wall nanotube may be formed from a one-atom thick sheet of graphite rolled into a seamless cylinder with a diameter that may be one nanometer. This type of nanotube is a carbon nanotube. The resulting structure is a nanotube having a length to diameter ratio that may exceed ten thousand. Nanotubes may have various configurations. For example, nanotubes that are made of carbon may be single-walled or multi-walled.

Carbon nanotubes have properties that make them potentially useful in many applications. These types of nanotubes may exhibit extraordinary strength and unique electrical properties. Further, nanotubes are efficient conductors of heat. Other types of nanotubes, such as inorganic nanotubes, have also been synthesized.

Limitations on use of carbon nanotubes include, for example, the length at which these tubes may be strung together. The longest carbon nanotube currently produced is eighteen millimeters long, making these types of nanotubes practically useless for large scale applications. As a result, many times carbon nanotubes are incorporated with other materials. This type of use may help increase the strength or other desirable properties of those materials. By dispersing or placing nanotubes into other components, the strength of those components is increased but not as great as nanotubes that are by themselves.

In bulk, materials including nanotubes may not have the same tensile strength as individual nanotubes. These types of configurations, however, may yield strengths that are sufficient for many applications. For example, carbon nanotubes have been used as composite fibers in polymers to improve mechanical, thermal, and electrical properties of various products. Nanotubes also may be used in various structural products, such as clothes, combat jackets, concrete, sports equipment, and bridges. Other uses for nanotubes include computer circuits, conductive films, air filters, water filters, and non-stick surfaces.

SUMMARY

The different advantageous embodiments provide a method for aligning nanotubes. In one embodiment, a method is used to align nanotubes. A bath with nanotubes dispersed on the surface of a solution is provided. An attachment surface is provided to attach the nanotubes. The attachment surface is placed into the bath at an angle of around ninety degrees relative to a surface of the bath. The attachment surface is removed from the bath at a rate sufficient to apply a velocity to the nanotubes in the bath of nanotubes such that the nanotubes are aligned on the attachment surface in a direction that is substantially parallel to the direction at which the substrate is removed to form a plurality of aligned nanotubes.

In another embodiment, a method is used for aligning nanotubes. A plurality of nanotubes is dispersed on the surface of a solution to form a plurality of dispersed nanotubes. A substrate with a surface is placed into the solution in which the surface is at an angle relative to a surface of the solution. The substrate is removed from the solution at the angle and at a rate sufficient to apply a velocity to the plurality of nanotubes such that the plurality of nanotubes align in a direction that is substantially parallel to the direction at which the substrate is removed to form a plurality of aligned nanotubes.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION

Figure 1:
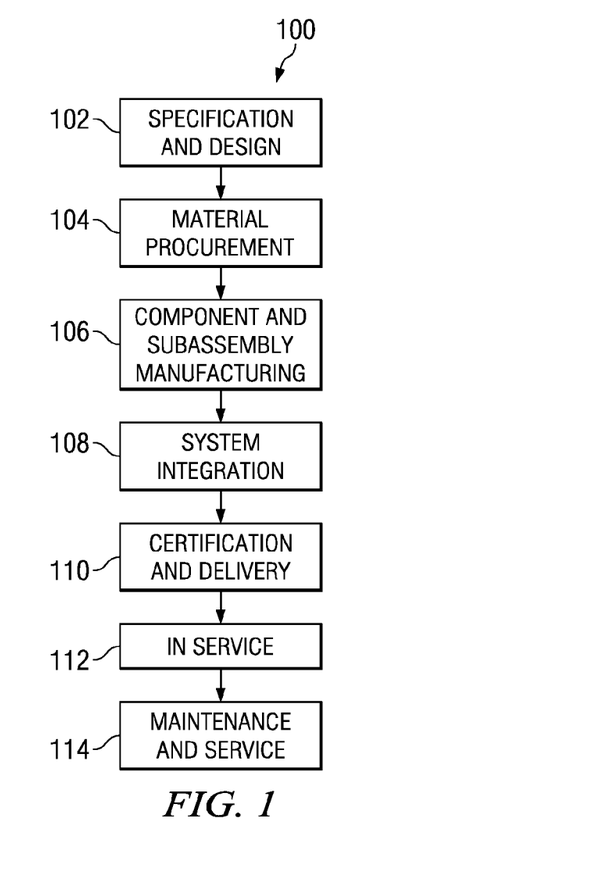
FIG. 1 is a diagram illustrating an aircraft manufacturing and service method in which an advantageous embodiment the present invention may be implemented.
Figure 2:
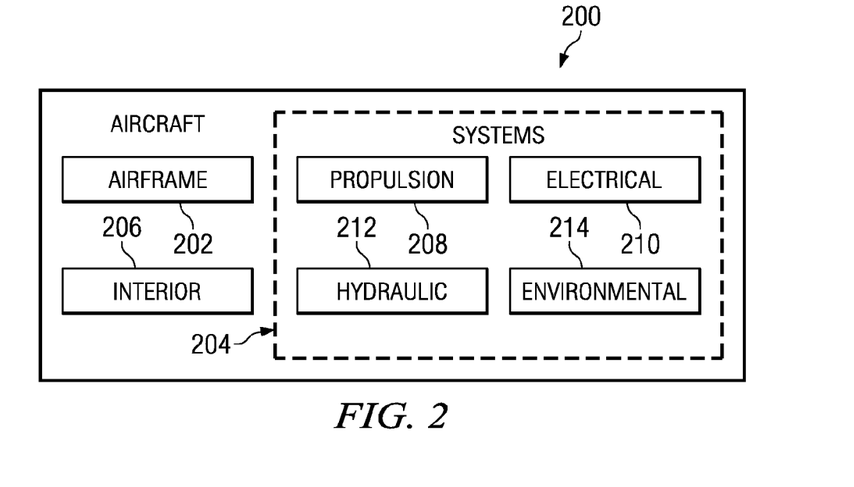
FIG. 2 is a diagram of an aircraft in which an in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. However, any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As a specific non-limiting example, nanotube meshes may be implemented in the coating of different surfaces for components of aircraft 200. For example, nanotube meshes, in the advantageous embodiments, may be used on the exterior surfaces of aircraft 200. These meshes may be added before and/or after a protective coating, such as paint, has been applied to aircraft 200. As a result, nanotube meshes may make the exterior surfaces potentially more aerodynamic and more resistant to environmental wear. Further, nanotube meshes also may be used in other components. For example, nanotube meshes may be added to composite components within airframe 202 to increase the strength of these components.

Further, nanotube meshes also may be used in interior components in aircraft 200, such as in seating, trays, closets, and other components to reduce the bulk and weight of the components as well as increase the strength of the components.

In view of existing limitations for using carbon nanotubes, the different advantageous embodiments provide a method and apparatus for creating nanotube meshes. An apparatus has a first sheet and a second sheet. The first sheet has first nanotubes aligned in a direction approximately parallel to each other. The second sheet has second nanotubes aligned in a direction approximately parallel to each other, wherein the first layer is attached to the second layer at set of points at which the first nanotubes contact the second nanotubes to form a nanotube mesh. These sheets also may be referred to as layers.

Figure 3:
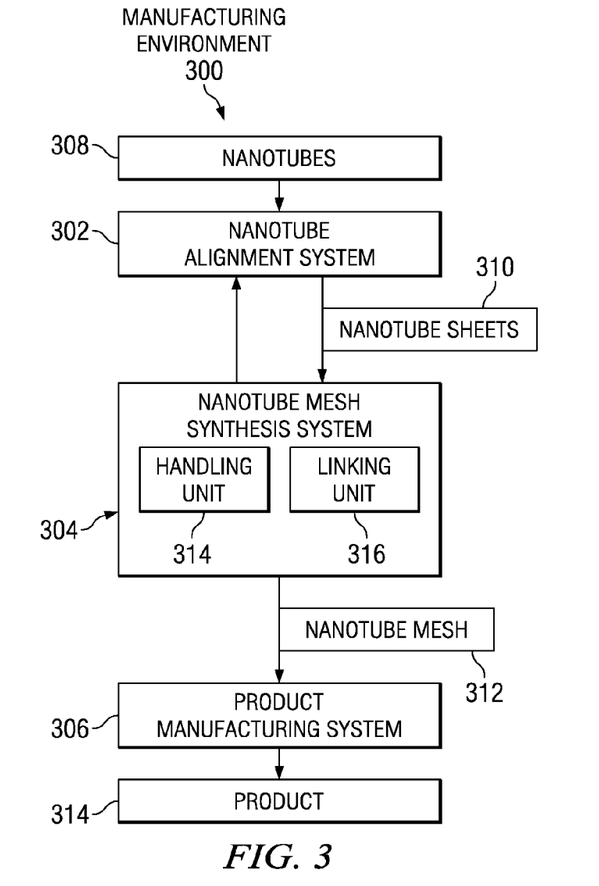
FIG. 3 is a diagram illustrating a nanotube mesh manufacturing system in accordance with an advantageous embodiment.

Turning now to FIG. 3, a diagram illustrating a nanotube mesh manufacturing system is depicted in accordance with an advantageous embodiment. In this example, manufacturing environment 300 includes nanotube alignment system 302, nanotube mesh synthesis system 304, and product manufacturing system 306.

Nanotubes 308 are supplied to nanotube alignment system 302 to generate nanotube sheets 310. Nanotubes 308, in these examples, are carbon nanotubes. In other embodiments, nanotubes 308 may take the form of other types of nanotubes, such as inorganic nanotubes. Nanotubes 308 may be all of the same size or, in some cases, a mixture of nanotubes with different sizes may be present within nanotubes 308. Nanotubes 308 may be obtained from a variety of sources. For example, single-wall carbon nanotubes may be obtained from Sigma-Aldrich Co. and Carbon Nanotechnologies, Inc.

Nanotube alignment system 302 generates nanotube sheets 310. In these examples, a sheet within nanotube sheets 310 is a plurality of nanotubes that are in an aligned form. In other words, the nanotubes are substantially parallel to each other in each sheet within nanotube sheets 310. In these examples, nanotubes within nanotube sheets 310 are considered to be substantially parallel to each other when the combination of those nanotubes with another sheet of nanotubes forms a nanotube mesh that has properties meeting various parameters. These parameters may vary and may include, for example, without limitation, a strength of the nanotube mesh, flexibility or agility, optical properties, filtering properties, durability, and conductivity. The particular parameters used, as well as their values, may vary depending on the particular implementation.

Nanotube sheets 310 are also referred to as just sheets, in these examples. In these examples, a nanotube sheet refers to the nanotubes in their aligned form. A nanotube sheet may, in some cases, also be referred to a substrate and/or film on which the nanotubes are aligned. In other words, a sheet or plane of nanotubes may be formed from multiple nanotubes that are parallel to each other.

Nanotube mesh synthesis system 304 uses nanotube sheets 310 to create nanotube mesh 312. In this example, nanotube mesh synthesis system 304 includes handling unit 314 and linking unit 316. Handling unit 314 may be used to handle nanotube sheets 310 generated by nanotube alignment system 302. Linking unit 316 is used to generate links between different sheets of aligned nanotubes in nanotube sheets 310 to form nanotube mesh 312. In these examples, nanotube mesh 312 may be preformed from two or more sheets from nanotube sheets 310. Linking unit 316 may take the form of an energy source, such as an x-ray, visible, infra-red, or ultraviolet light, an electron beam, or a chemical reaction. Handling unit 314 may be a computer controlled mechanism for handling nanotube sheets 310. In these examples, nanotube sheets 310 may be located on a fluid or solid film on the substrate manipulated by handling unit 314.

In some embodiments, nanotube mesh synthesis system 304 interacts with nanotube alignment system 302 to generate nanotube mesh 312. For example, nanotube sheets 310 may be returned to nanotube alignment system 302 to generate additional aligned nanotubes in a different orientation on the same substrate on which a sheet from nanotube sheets 310 is found. In this case, nanotube mesh synthesis system 304 turns or rotates the substrate on which nanotube sheets 310 are generated with respect to nanotube alignment system 302 to create another sheet of aligned nanotubes at an angle from the original set of aligned nanotubes. While nanotube alignment system 302 creates a second sheet of aligned nanotubes, nanotube mesh synthesis system 304 may interact by providing energy through linking unit 316 to link the two sheets of nanotubes.

Nanotube mesh synthesis system 304 may use two or more nanotube sheets to form a nanotube mesh 312. For example, a set of nanotubes aligned in one direction is placed over or joined with another set of nanotubes such that the different sheets or lines of nanotubes meet each other at an angle. As an example, two sheets of parallel nanotubes may be aligned such that the nanotubes in each sheet are perpendicular to the nanotubes in the other sheet. Of course, other angles of alignment may be used other than one that is substantially perpendicular. Other angles may include, for example, without limitation, 45 degree angles, 70 degree angles, or 80 degree angles. In some advantageous embodiments, three or four sheets of nanotubes may be used to form nanotube mesh 312. The numbers of sheets are described as examples and are not intended to limit the number of sheets used in this example.

Nanotube mesh 312 may be used by product manufacturing system 306 to create product 314. Product manufacturing system 306 may take various forms. For example, product manufacturing system 306 may be a currently used manufacturing system or facility that is modified to include nanotube meshes as part of the process of manufacturing the product. In other advantageous embodiments, product manufacturing system 306 may be specifically designed to produce product 314 using nanotube mesh 312. Product 314 may take various forms, including nanotube mesh 312. Nanotube mesh 312 may be used to manufacture different components of an aircraft. These components may include, for example, glass used in the aircraft, coatings for various surfaces on the aircraft, filters for use in the aircraft, and a coating for the outer surface of the aircraft.

Further, nanotube mesh 312 also may be used in various displays in the aircraft. When used in glass, a nanotube mesh may distribute any force on the mesh to the edges. As a result, a material incorporating a nanotube mesh in glass may be capable of supporting a load while less than around four nanometers thick. This material may be optically transparent. Further, nanotube mesh 312 may be used as a replacement for normal glass for various applications such as windows, windshields, and computer screens. Nanotube mesh 312 has holes and may be permeable to air, water, and other fluids. If permeability is undesirable, a layer of nanotube mesh 312 may be coated on one or both sides of a glass pane or even placed within the glass pane during promotion of this glass. This type of use of nanotube mesh 312 increases the structural characteristics.

Further, nanotube mesh 312 may be used as a coating for different surfaces of an aircraft. For example, coating the outside of the aircraft with a nanotube mesh may make repainting the outside of an aircraft unnecessary for longer periods of times, if at all.

In addition to using nanotube mesh 312 to manufacture aircraft, these types of meshes may be used for other types of product. For example, nanotube mesh 312 may be used to generate product 318 in the form of a filter. The filter may be made by suspending one nanotube mesh at some specified distance above another nanotube mesh to generate a deconstructive interference. This deconstructive interference may remove a particular frequency of light from the spectrum. Further, nanotube mesh 312 also may be used to enhance the material strength of different substances. For example, nanotube mesh 312 may be added to a wooden table to reduce the possibility of scratches.

Further, nanotube mesh 312 may be used to manufacture rope that is difficult to break or cut. Also, nanotube mesh 312 may be used as a non-stick coating for various items, such as non-stick pots, windows, and floors.

Additionally, nanotube mesh 312 may be formed into different shapes. Nanotube mesh 312 is flexible until cured and may be formed into whatever shape is desired. An object may be coated with nanotube mesh 312 and cured to provide the desired shape. The mold around which nanotube mesh 312 is formed may be removed after nanotube mesh 312 is cured. The result is that a product made of nanotube meshes may be generated.

Nanotube mesh 312 may be used to filter particles from air, liquids, and other gasses. For example, nanotube mesh 312 may be designed to remove substances, such as, for example, without limitation, virus and allergens from the air in an aircraft or a building.

Nanotube mesh 312 may be used in manufacturing vehicles. For example, nanotube mesh 312 may be used as a windshield glass replacement or reinforcement.

Further, a fiber-glass body of a vehicle may be made lighter, thinner, and more scratch resistant when coated with nanotube mesh 312. Further, structural components, such as frame or unibody of a car, may be made stronger and lighter by incorporating or using nanotube mesh 312.

Building materials is another exemplary use of nanotube mesh 312. Nanotube mesh 312 may be used to coat wood or other structural materials to increase the strength of these materials. Another example is to incorporate nanotube mesh 312 into steel or concrete to reinforce these materials without changing the surface.

Carbon nanotubes have a higher melting point than most metals, and the melting point is almost as high as that of tungsten. As a result, nanotube mesh 312 may be a desirable material for industrial processes that involve the melting or softening of materials or other high temperature applications. Another example of a use for nanotube mesh 312 is for incorporation of various structures in aircraft. Nanotube mesh 312 may be stable at the temperatures experienced by re-entry into the atmosphere by a spacecraft. Optical displays may incorporate nanotube mesh 312. Nanotube mesh 312 may be a transparent conducting material and may be made as part of transparent circuitry for monitors.

Nanotube mesh 312 also may be implemented in various military applications, such as, for example, armor for vehicles and body armor for soldiers. The permeability of nanotube mesh 312 to air may make body armor for soldiers more comfortable. As another example, nanotube mesh 312 may be used within gun barrels to transfer heat away from the barrel during firing. Further, nanotube mesh 312 may be used to provide a low friction surface as compared to current gun barrels. As a result, increased rates of fire may be possible. Also, nanotube mesh 312 may be used to generate thin object slices in very thin rigid objects for weaponry. Of course, many other applications may be possible with nanotube mesh 312, in addition to those described in these illustrative examples.

In these examples, the different functional blocks are provided for the purpose of illustrating different features of the different advantageous embodiments. This illustration is not meant to apply architectural limitations in a manner in which different features may be implemented. For example, components within nanotube alignment system 302 and nanotube mesh synthesis system 304 may be combined as a single system rather than as two systems. In other embodiments, features for aligning nanotubes and creating nanotube meshes may be incorporated within product manufacturing system 306 as a single system or component.

Figure 4:
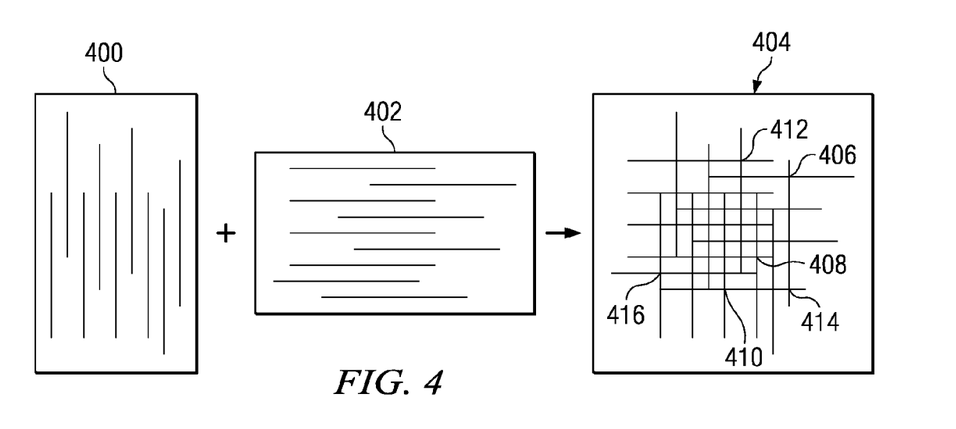
FIG. 4 is a diagram illustrating the formation of a nanotube mesh in accordance with an advantageous embodiment.

With reference now to FIG. 4, a diagram illustrating the formation of a nanotube mesh is depicted in accordance with an advantageous embodiment. In this example, sheet 400 and sheet 402 are combined to form nanotube mesh 404. Sheet 400 and sheet 402 are examples of nanotubes sheets, such as nanotube sheets 310 in FIG. 3. Nanotube mesh 404 is an example of nanotube mesh 312 in FIG. 3.

In this particular example, sheet 400 is a plurality of nanotubes aligned substantially parallel to each other. Sheet 402 is another plurality of nanotubes that are also aligned substantially parallel to each other. In this example, sheet 400 is aligned with respect to sheet 402 such that nanotubes of sheet 400 are substantially perpendicular to nanotubes in sheet 402. These two sheets are combined to form nanotube mesh 404.

The two pluralities of nanotubes in sheet 400 and sheet 402 are attached to each other at a set of points at which the nanotubes of the different sheets touch each other. The set of points are one or more points. In these examples, points 406, 408, 410, 412, 414, and 416 are examples of some points in the set of points for nanotube mesh 404 at which sheets 400 and 402 are linked to each other. These points may be also referred to as link points.

The linking of nanotubes at these points may occur through bond interactions that occur between the different nanotubes at the set of points. These bond interactions may be the same atomic bonds that give carbon nanotubes their structure to form the links between these nanotubes. In many of the different advantageous embodiments, atomic bonds are used to link the different nanotubes to each other. In these illustrative examples, these links are cross links that may have approximately the same strength as a nanotube. These cross links, however, may be subject to torques that may cause a deformation or rotation of one nanotube with respect to another.

The number of cross links formed between sheets 400 and 402 may define a property of nanotube mesh 404, such as the rigidity of nanotube mesh 404. As more cross links are present, the mesh becomes more rigid or harder. The formation of the cross links at the set of points is also referred to as "curing". As more cross links are formed between the different sets of points, the tensile strength of nanotube mesh 404 approaches that of an individual nanotube.

These different cross links may be made through applying energy to nanotube mesh 404. This energy may be applied through an energy source within nanotube mesh synthesis system 304 in FIG. 3. In particular, linking unit 316, within nanotube mesh synthesis system 304 in FIG. 3, may provide the energy used to create links or bonds. For example, x-ray energy may be applied to nanotube mesh 404 to create cross links at the set of points.

The amount of x-ray energy may define how many cross links are formed at the set of points. These cross links may take the form of a covalent bond or a sharing of carbon items, which is a specific type of covalent bond. Further, other non-covalent bonds may be used. For example, a Van der Waals bond is an example of a non-covalent bond that may be used to attach or link sheet 400 to sheet 402. This type of bond does not require the introduction or application of energy from an energy source.

Sheet 400 and sheet 402 may be constructed using a number of different mechanisms. The alignment of nanotubes to form sheet 400 and sheet 402 may be achieved through a number of different methods. These methods include, for example, without limitation, magnetic alignment and rotating and pulling. Magnetic alignment includes exposing nanotubes to a magnetic field that is sufficiently strong to cause the nanotubes to align in a substantially parallel manner. The rotating and pulling method makes sheets of aligned nanotubes rolled out of a forest of nanotubes. In this type of method, touching a substrate to a free end of a forest of nanotubes and pulling the surface away from the forest of nanotubes may produce a sheet of aligned nanotubes.

In these examples, a fluid method is disclosed in the advantageous embodiments. This fluid method is one presented by the different advantageous embodiments for use in aligning nanotubes, in addition to currently known methods as described above. In one advantageous embodiment, a fluid method is used for aligning nanotubes. Nanotubes are dispersed on the surface of a solution. This embodiment may require nanotubes to be in the solution to form dispersed nanotubes. A substrate with a surface is placed into the solution in which the surface is at an angle relative to a surface of the solution. The substrate is removed from the solution at an angle and at a rate sufficient to apply a velocity gradient to the nanotubes such that the nanotubes align in a direction that is substantially parallel to the direction of motion to form aligned nanotubes. FIGS. 5-9 illustrate steps used to align nanotubes in a fluid method as disclosed by the advantageous embodiments.

Figure 5:
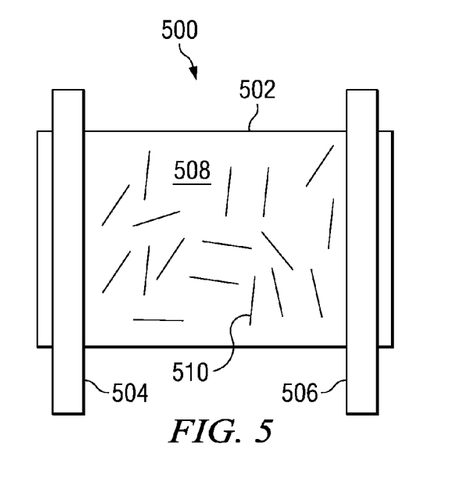
FIG. 5 is a top view of an apparatus in a nanotube alignment system in accordance with an advantageous embodiment.

With reference now to FIG. 5, a top view of an apparatus in a nanotube alignment system is depicted in accordance with an advantageous embodiment. In this example, alignment device 500 includes tank 502 and surface arms 504 and 506. In this example, alignment device 500 is an example of a device that may be found in nanotube alignment system 302 in FIG. 3. Surface arms 504 and 506 may be moveable in a manner to change the surface area of solution 508 within tank 502. In these examples, surface arms 504 and 506 may be moveable through a computer controlled mechanism.

In these different examples, alignment device 500 may be implemented using a commercially available device, such as, for example, a Langmuir Blodgett apparatus. An example of such a device is a KSV2000 series Langmuir Blodgett apparatus, which is available from Scientific Solutions SA. This type of device is currently used for other purposes, such as measuring surface tensions.

In the different advantageous embodiments, this type of device may be used to align nanotubes 510 dispersed on the surface of solution 508. In these examples, nanotubes 510 are dispersed in a manner such that they float near the surface, based on surface tension with respect to solution 508.

The type of solution used may vary, depending on the particular implementation. Any solution may be used that may provide a surface tension for holding nanotubes in a manner that allows those nanotubes to be aligned as the surface area changes. In these examples, solution 508 may be, for example, a aqueous surfactant solution, such as a soap solution. In these examples, the surfactant may be a non-ionic surfactant, such as stearic acid, stearyl alcohol, Triton®-X 100, or Brij® 98. Triton®-X 100 is a registered trademark of Union Carbide Chemicals and Plastics Co. Inc., and Brij® 98 is a registered trademark of ICI Americas, Inc.

Figure 6:
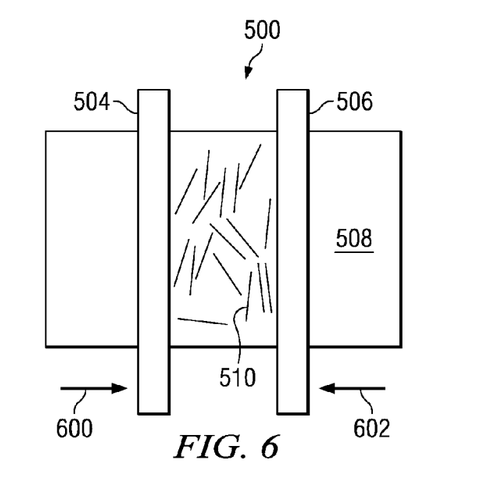
FIG. 6 is a diagram illustrating the pre-alignment of nanotubes in an apparatus in a nanotube alignment system in accordance with an advantageous embodiment.

Turning now to FIG. 6, a diagram illustrating the pre-alignment of nanotubes in an apparatus in a nanotube alignment system is depicted in accordance with an advantageous embodiment. In this illustration, surface arms 504 and 506 have been moved towards each other along the direction of arrows 600 and 602. By moving surface arms 504 and 506 in these directions, nanotubes 510 orient in a similar direction such that they become substantially parallel to each other. This process may pre-align nanotubes 510 prior to forming a layer or sheet of nanotubes from nanotubes 510.

In the different examples, nanotubes 510 may take various forms. For example, nanotubes 510 may be single-wall or multi-wall nanotubes. These nanotubes also may be carbon nanotubes or may be made from other types of materials. One example of a non-carbon nanotube is galliun nitride. Further, nanotubes 510 may be any chirality. In other words, nanotubes 510 may be semiconductor or metallic in nature, depending on the particular implementation.

Figure 7:
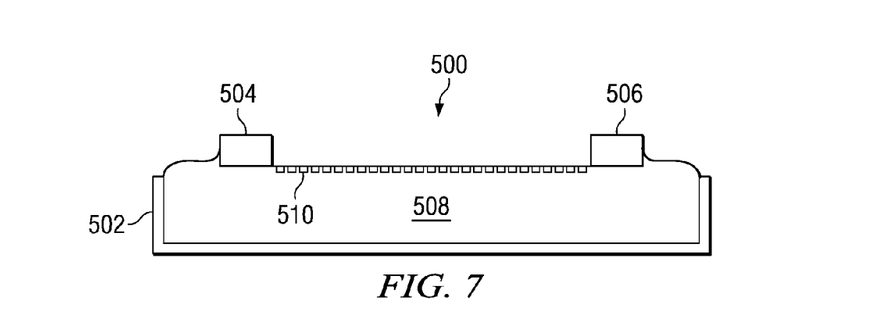
FIG. 7 provides a cross-sectional view of an alignment device in accordance with an advantageous embodiment.

FIG. 7 provides a cross-sectional view of an alignment device. In this example, nanotubes 510 are oriented in a manner such that they are parallel to each other within solution 508 in tank 502.

Figure 8:
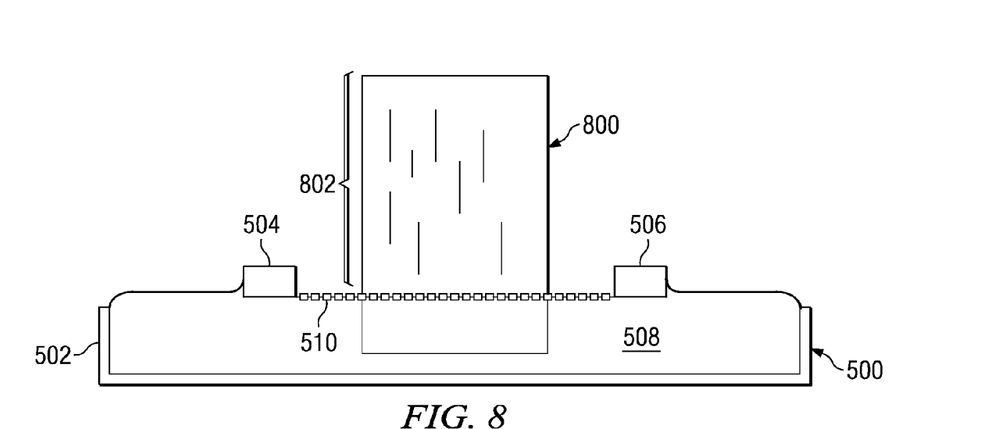
FIG. 8 is a diagram illustrating the aligning of nanotubes on a substrate in accordance with an advantageous embodiment.

With reference now to FIG. 8, a diagram illustrating the aligning of nanotubes on a substrate is depicted in accordance with an advantageous embodiment. In this example, substrate 800 has been introduced into solution 508 and is withdrawn such that portion 802 of nanotubes 510 adhere to substrate 800 and align the nanotubes to form a sheet of nanotubes. The nanotubes in this sheet are aligned in the direction approximately parallel to each other. This sheet of nanotubes may have a length, a width, and a thickness of at least the dimension of a single nanotube, in these examples. Of course, the actual dimension of a sheet of nanotubes may vary, depending on the size of substrate 800.

Substrate 800 may take various forms. For example, substrate 800 may be any material from which a sheet of nanotubes may be formed by drawing substrate 800 out of solution 508. In these examples, substrate 800 may be, for example, without limitation, amorphous silicon dioxide.

The aligned nanotubes are substantially parallel to each other, in these examples. Substrate 800 is removed from solution 508 at an angle and at a rate sufficient to apply velocity to nanotubes 510 such that portion 802 of nanotubes 510 adhere to the surface of substrate 800 in a direction that is substantially parallel to the surface to form aligned nanotubes. The rate at which substrate 800 is withdrawn from solution 508 may vary, depending on the particular implementation. In this example, the rate is $1 \times 10^{-2}$ m/s. The operating condition for creating a sheet of nanotubes, in these examples, is at ambient temperature and pressure. Alignment device 500 may be mounted on a vibration damped workbench to reduce or eliminate vibrations.

Figure 9:
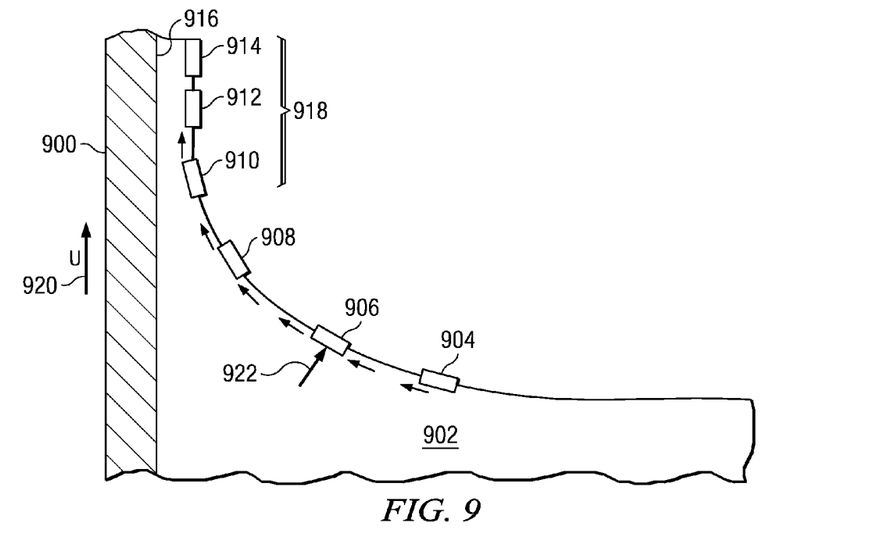
FIG. 9 is a more detailed diagram illustrating the aligning of nanotubes on a substrate in accordance with an advantageous embodiment.

Turning now to FIG. 9, a more detailed diagram illustrating the aligning of nanotubes on a substrate is depicted in accordance with an advantageous embodiment. In this example, substrate 900 is shown as being drawn out of solution 902 in which nanotubes, such as nanotubes 904, 906, 908, 910, 912, and 914 are located on the surface of solution 902. In these examples, solution 902 is an example of a solution in an alignment apparatus, such as alignment apparatus 500 in FIG. 5.

By drawing substrate 900 out of solution 902 at a selected velocity, nanotubes, such as nanotubes 910, 912, and 914 are aligned on substrate 900. In these examples, only a cross-section of substrate 900 is illustrated. Other nanotubes located parallel to nanotubes 904, 906, 908, 910, 912, and 914 are present, but not seen in this view. These nanotubes also are drawn up and aligned on substrate 900 in a substantially parallel direction to the illustrated nanotubes.

In these examples, the alignment of these nanotubes on substrate 900 is not performed directly on surface 916 of substrate 900. Instead, the alignment of these nanotubes on substrate 900 is on a film at section 918 formed from solution 902 that adheres to surface 916 of substrate 900.

Nanotubes, such as nanotubes 904, 906, and 908 are drawn towards surface 916 of substrate 900 through the movement of substrate 900 along direction 920 out of solution 902. Arrow 922 illustrates the motion of solution 902 as substrate 900 is being moved out of solution 902. Arrow 922 illustrates a velocity gradient that is sufficient to cause the nanotubes in solution 902 to align in the direction of motion of substrate 900. After substrate 900 has been moved out of solution 902, forming a first sheet of nanotubes, a second sheet of nanotubes may be formed on substrate 900.

Solution 902 is present on both sides of substrate 900. In this example, only the solutions shown on the side of surface 916 is depicted for purposes of illustrating the manner in which nanotubes are aligned to form a sheet of nanotubes on substrate 900. Further, substrate 900 is shown as being drawn out of solution 902 at an angle of around ninety degrees. Other angles may be used, depending on the particular implementation.

Figure 10:
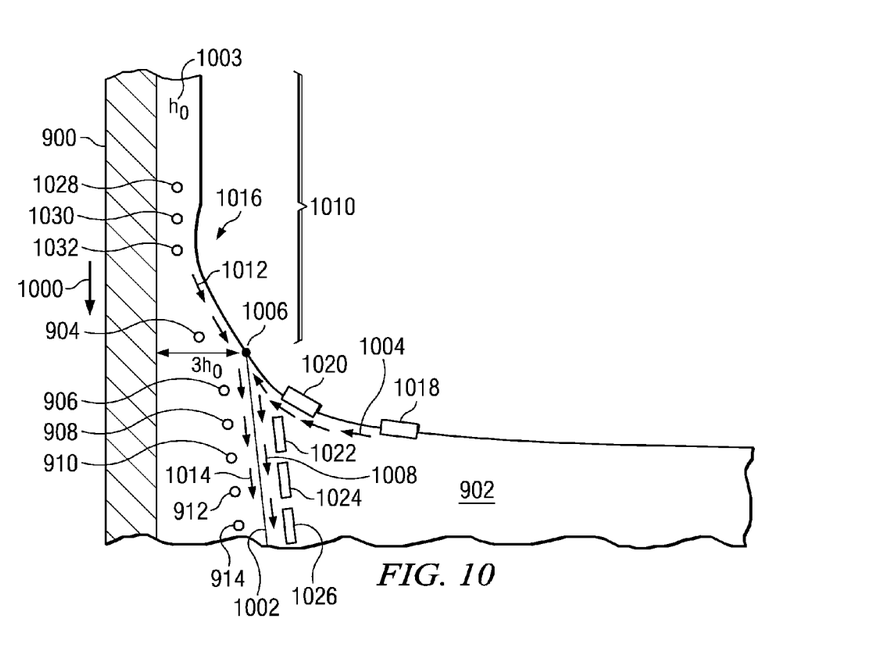
FIG. 10 is a diagram illustrating the creation of a second sheet of nanotubes in accordance with an advantageous embodiment.

With reference now to FIG. 10, a diagram illustrating the creation of a second sheet of nanotubes is depicted in accordance with an advantageous embodiment. After substrate 900 is withdrawn from solution 902 as illustrated in FIG. 9, substrate 900 may be rotated around 90 degrees and reintroduced into solution 902 at around the same angle. The rotation of substrate 900 by 90 degrees is performed to create a second layer or sheet of nanotubes that is positioned substantially perpendicular to the first sheet of nanotubes.

In this example, substrate 900 is moved in direction 1000 into solution 902. As illustrated, the downward movement of substrate 900 into solution 902 causes fluid instability line 1002. In this example, fluid to the left of fluid instability line 1002 is part of film 1003 on substrate 900 that was previously formed from withdrawing substrate 900 from a solution. In these examples, the solution may be solution 902, or solution from another container, depending on the particular embodiment.

Solution 902 moves along the direction of arrows 1004 to include instability point 1006. Thereafter, solution 902 moves downward along the direction of arrows 1008 along fluid instability line 1002. Solution from the film on substrate 900 moves along the direction of arrows 1012 and 1014. As can be seen, in this example, neck 1016 is present on film 1003 in section 1010.

Nanotubes on the surface of solution 902 are aligned by the sharp velocity gradient at instability point 1006. As a result, the nanotubes line up perpendicular to the nanotubes already on film 1003 of substrate 900.

In this example, nanotubes 1018 and 1020 are still located on solution 902. Nanotubes 1022, 1024, and 1026 are aligned along fluid instability line 1002 in an orientation that is about perpendicular to nanotubes 904, 906, 908, 910, 912, and 914. The orientation also may be described as about or substantially parallel to a direction of motion of substrate 900, which is shown by arrow 1000. In this example, nanotubes 1022, 1024, and 1026 contact nanotubes 904, 906, 908, 910, and 912 at a set of points. Nanotubes 1028, 1030, and 1032 are nanotubes also previously aligned, but not shown in FIG. 9. These nanotubes are located in section 1010. In other examples, some nanotubes may not contact others. A set of links between the nanotubes at this set of points may be made to form a nanotube mesh, such as nanotube mesh 404 in FIG. 4.

The application of x-rays or x-ray energy below instability point 1006, in these examples, may cause a formation of the nanotube mesh. The application of the x-ray energy may cause a set of points at which nanotubes from the first sheet contact nanotubes in the second sheet to be linked to each other. The amount of x-ray energy may change the number of links that are formed between nanotubes and the two different sheets at the set of points. Some points in the set of points may not have links formed, depending on the amount of x-ray energy applied.

Figure 11:
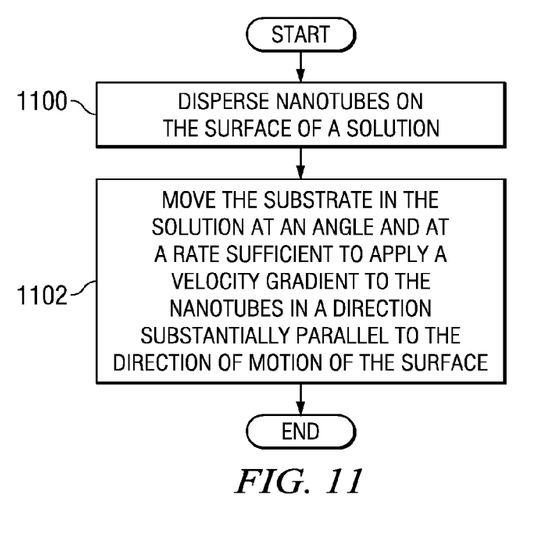
FIG. 11 is a flowchart of a process for aligning nanotubes in accordance with an advantageous embodiment.

With reference now to FIG. 11, a flowchart of a process for aligning nanotubes is depicted in accordance with an advantageous embodiment. The process illustrated in FIG. 11 may be performed using a nanotube alignment system, such as alignment device 500 in FIG. 5. As a specific example, alignment device 500 in FIG. 5 may be used to perform the alignment of nanotubes with respect to a substrate.

The process begins by dispersing nanotubes onto the surface of a solution (operation 1100). Thereafter, the substrate is moved in the solution at an angle and at a rate sufficient to apply velocity gradient to the nanotubes on the surface of the solution to align the nanotubes in a direction substantially parallel to the direction of motion of the surface (operation 1102). Operation 1102 may be performed by moving the substrate out of the solution. In addition, operation 1102 also may be performed by moving the substrate into the solution, depending on the particular implementation. The movement of the substrate into the solution may be performed using nanotube alignment system 302 and/or nanotube mesh synthesis system 304 in FIG. 3.

Figure 12:
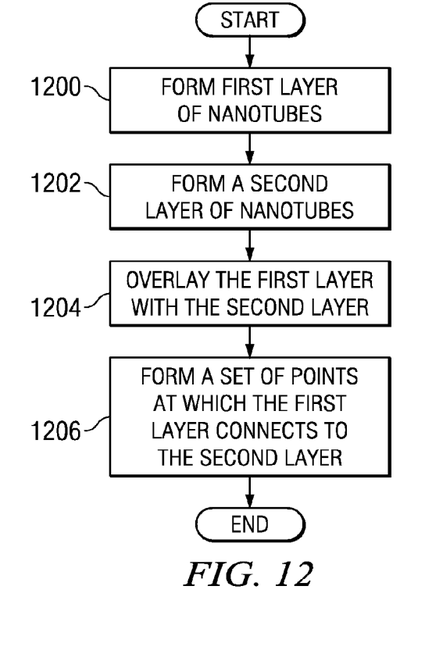
FIG. 12 is a flowchart of a process for manufacturing nanotube mesh in accordance with an advantageous embodiment.

With reference now to FIG. 12, a flowchart of a process for manufacturing nanotube mesh is depicted in accordance with an advantageous embodiment. The process illustrated in FIG. 12 may be implemented using manufacturing environment 300 in FIG. 3.

The process begins by forming a first layer of nanotubes (operation 1200). Thereafter, a second layer of nanotubes is formed (operation 1202). The first layer of nanotubes is overlaid with the second layer nanotubes (operation 1204). The process then forms a set of points at which the first layer connects to the second layer (operation 1206), with the process terminating thereafter.

Operations 1200 and 1202 may be performed using a process, such as the process illustrated in FIG. 11 above to align nanotubes. Depending on the embodiment, the first layer of nanotubes may be overlaid with the second layer of nanotubes while the second layer of nanotubes is formed.

Thus, the different advantageous embodiments provide a nanotube mesh and a method for manufacturing nanotube meshes, which include aligning nanotubes to create sheets of aligned nanotubes. In one advantageous embodiment, an apparatus has a first sheet and a second sheet. The first sheet has first nanotubes aligned in a direction approximately parallel to each other. The second sheet has second nanotubes aligned in a direction approximately to each other, wherein the first layer is attached to the second layer at set of points at which the first nanotubes contact the second nanotubes to form a nanotube mesh.

A method is used for aligning nanotubes in one advantageous embodiment. Nanotubes are dispersed on the surface of a solution to form a plurality of dispersed nanotubes. A substrate with a surface is placed into the solution in which the surface is at an angle relative to a surface of the solution. The substrate is removed from the solution at an angle and at a rate sufficient to apply a velocity gradient to the nanotubes such that the nanotubes align in a direction that is substantially parallel to the direction of motion to form aligned nanotubes.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. For example, although many of the illustrative examples are directed towards components for aircraft, the processes used to align nanotubes and to create nanotube meshes may be used in conjunction with other types of products.

The different advantageous embodiments may be applied to products, such as, for example, furniture, automobiles, spacecraft, fire arms, and glass products. The aligning process may also be used to generate aligned sheets made of multiple materials, when sheets 400 and 402 are aligned in the same direction and are made of materials that otherwise would not be parallel to each other when mixed, such as two types of fatty acids that would coagulate or react when mixed.

The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for aligning nanotubes, the method comprising:
   dispersing nanotubes in a solution along a surface of the solution to form a first bath;
   placing an attachment surface into the first bath at an angle of around ninety degrees relative to a surface of the first bath;
   removing the attachment surface from the first bath at a first rate to form a covered attachment surface, the first rate sufficient to apply a velocity to the nanotubes in the first bath such that a first plurality of nanotubes align on the attachment surface in a direction that is substantially parallel to the direction at which the attachment surface is removed to form a plurality of aligned nanotubes;
   rotating the covered attachment surface to form a rotated attachment surface;
   placing the rotated attachment surface into a second bath; and
   applying energy to the plurality of aligned nanotubes, the energy sufficient to form a number of links between a first number of nanotubes in the plurality of aligned nanotubes and a second number of nanotubes in the second bath.

2. The method of claim 1 further comprising:
   pre-aligning the nanotubes prior to placing the attachment surface into the bath.

3. The method of claim 1, wherein the solution is an aqueous surfactant solution.

4. The method of claim 3, wherein the surfactant is selected from one of stearic acid and stearyl alcohol.

5. The method of claim 1, wherein applying the energy to the plurality of aligned nanotubes comprises:
applying the energy to the plurality of aligned nanotubes below an instability point of the second bath.

6. The method of claim 1, wherein the second bath comprises the first bath after the attachment surface is removed from the first bath.

7. The method of claim 1, wherein the energy comprises x-ray energy.

8. The method of claim 1, wherein applying energy to the plurality of aligned nanotubes forms a nanotube mesh.

9. A method for aligning nanotubes, the method comprising:
dispersing a plurality of nanotubes on a surface of a first solution to form a plurality of dispersed nanotubes;
placing a substrate with a surface into the first solution in which the surface is at an angle relative to a surface of the first solution;
removing the substrate from the first solution at the angle and at a first rate to form a covered substrate, the first rate sufficient to apply a velocity to the plurality of dispersed nanotubes such that a number of the plurality of dispersed nanotubes align on the substrate in a direction that is substantially parallel to the direction at which the substrate is removed to form a plurality of aligned nanotubes;
rotating the covered substrate to form a rotated substrate;
placing the rotated substrate into a second solution at the angle and at a second rate, the second rate sufficient to apply a second velocity gradient to a second plurality of nanotubes in the second solution such that the second plurality of nanotubes are aligned on the substrate in a direction that is substantially parallel to a direction in which the substrate is placed into the second solution; and
applying energy to the plurality of aligned nanotubes, the energy sufficient to form a number of links between a first number of nanotubes in the plurality of aligned nanotubes and a second number of nanotubes in the second plurality of nanotubes.

10. The method of claim 9, wherein the angle is around ninety degrees.

11. The method of claim 9, wherein the solution is an aqueous surfactant solution.

12. The method of claim 11, wherein the surfactant is selected from stearic acid and stearyl alcohol.

13. The method of claim 9, wherein the dispersing step comprises:
dispersing the plurality of nanotubes in the solution in a Langmuir Blodgett apparatus to form the plurality of dispersed nanotubes.

14. The method of claim 9, wherein the substrate is formed from amorphous silicon dioxide.

15. The method of claim 9, wherein the plurality of nanotubes are selected from one of carbon nanotubes and gallium nitride nanotubes.

16. The method of claim 9, wherein applying the energy to the plurality of aligned nanotubes comprises:
applying the energy to the plurality of aligned nanotubes below an instability point of the second solution.

17. The method of claim 9, wherein the second solution comprises the first solution after the substrate is removed from the first solution.

18. The method of claim 9, wherein the energy comprises x-ray energy.

19. The method of claim 9, wherein applying energy to the plurality of aligned nanotubes forms a nanotube mesh.

* * * * *